US006134029A

United States Patent [19]
Granger

[11] Patent Number: 6,134,029
[45] Date of Patent: Oct. 17, 2000

[54] SCANNER CALIBRATION TECHNIQUE

[75] Inventor: Edward M. Granger, Rochester, N.Y.

[73] Assignee: Light Source Acquisition Company, Grandville, Mich.

[21] Appl. No.: 08/709,774

[22] Filed: Sep. 9, 1996

[51] Int. Cl.$^7$ ...................................................... H04N 1/40
[52] U.S. Cl. ........................................... 358/504; 358/520
[58] Field of Search .................................... 358/500, 504, 358/509, 517, 520, 527; 382/162

[56]            References Cited

U.S. PATENT DOCUMENTS

| | | | |
|---|---|---|---|
| 3,986,202 | 10/1976 | Granger | 358/4 |
| 4,843,573 | 6/1989 | Taylor et al. | 395/131 |
| 4,929,978 | 5/1990 | Kanamoni | 355/38 |
| 5,231,504 | 7/1993 | Magee | 358/500 |
| 5,243,414 | 9/1993 | Dalrymple et al. | 358/500 |
| 5,309,257 | 5/1994 | Bonino et al. | 358/504 |
| 5,313,291 | 5/1994 | Appel | 358/501 |
| 5,317,425 | 5/1994 | Spence et al. | 358/504 |
| 5,323,249 | 6/1994 | Liang | 358/518 |
| 5,363,318 | 11/1994 | McCawley | 364/571.01 |
| 5,450,216 | 9/1995 | Kasson | 358/518 |
| 5,463,480 | 10/1995 | MacDonald et al. | 358/520 |
| 5,650,942 | 7/1997 | Granger | 364/526 |

FOREIGN PATENT DOCUMENTS

| | | | |
|---|---|---|---|
| 0 750 419 | 12/1996 | European Pat. Off. | H04N 1/60 |
| 195 14 618 | 11/1995 | Germany | H04N 1/60 |
| 8-111784 | 4/1996 | Japan | H04N 1/60 |

OTHER PUBLICATIONS

Granger, E.M., "Uniform Color Space as a Function of Spatial Frequency," SPIE vol. 1913 (1993), pp. 449–461.

Granger, E.M., "Is CIE L*a*b* Good Enough for Desktop Publishing?" SPIE vol 2170, *Device–Independent Color Imaging*, pp. 144–148 (Eric Walowit, Chair/Editor; Feb. 7–8, 1994, San Jose, CA).

Granger, E.M., "ATD, Appearance Equivalence, and Desktop Publishing," SPIE vol. 2170, *Device–Independent Color Imaging*, pp. 163–168 (Eric Walowit, Chair/Editor; Feb. 7–8, 1994, San Jose, CA).

Granger, E.M., "Gamut Mapping for Hard Copy Using the ATD Color Space," SPIE vol. 2414, *Device–Independent Color Imaging II*, pp. 27–35 (Eric Walowit, Chair/Editor; Feb. 7–8, 1995, San Jose, CA).

Benzschawel et al., "ATD: Toward a Uniform Color Space," *Color Research & Appl.*, vol. 9, No. 3, pp. 133–140.

Granger, E.M. et al., "Visual Chromaticity Transfer Functions," 1973 Annual Meeting, Optical Society of America, (Abstract) pp. 1287–1288 (Color II, Contributed Papers (C.J. Bartleson, Presider)).

Granger, E.M., "Subjective Assessment and Specificaton of Color Image Quality," *Image Assessment Spec. Opt. Soc. Am.* 1974, pp. 86–92.

Granger, Edward M., "A Summary Measure of Image Quality," SPIE vol. 432 (1983), pp. 340–347.

Granger, Edward M., "Visual Limits to Image Quality," SPIE vol. 528, *Digital Image Processing* (1985), pp. 95–102.

Granger, E.M., "A Constant–Bandwidth Grating–Lens Spectrometer," SPIE vol. 2413, *Color Hard Copy and Graphic Arts IV*, pp. 333–338 (Jan Bares, Chair/Editor; Feb. 6–10, 1995, San Jose, CA).

*Primary Examiner*—Jerome Grant, II
*Attorney, Agent, or Firm*—Townsend and Townsend and Crew LLP

[57]            ABSTRACT

An efficient technique for calibrating a scanner relative to a particular colorant set having N primary colorants. Once the scanner is calibrated, the scanner's device-dependent tristimulus values for an arbitrary color are transformed to a device-independent representation of the arbitrary color in a computationally efficient manner. The technique exploits the fact that the color space defined by the primary colorants can be advantageously partitioned, with each partition being represented by a transformation matrix that accurately characterizes the transformation for that partition of the space. The partitioning is characterized by a set of M key colors (in a specific embodiment, M=2N), each of which defines a boundary between adjacent partitions.

32 Claims, 3 Drawing Sheets

SCANNER CALIBRATION TECHNIQUE

BACKGROUND OF THE INVENTION

The present invention relates generally to color management in graphic arts (GA) publishing, and more specifically to techniques for calibrating scanners. The term "scanner" used herein is intended to include not only devices that scan a printed input but also other devices that receive radiation and output color signals, such as digital cameras.

A computer system providing color management functions comprises various devices that receive or output color images. Each such device usually has its own, device-dependent, way of specifying a particular color. Typically, each device communicates color information to other devices by mapping its device-dependent color specifications into corresponding specifications in a common device-independent representation of color used throughout the computer system. One such device-independent representation of color is the XYZ color space defined by the CIE (Commission Internationale de l'Éclarage in French).

One common device in color management systems is a scanner, which scans a color printed image. A typical scanner provides a set of RGB (red-green-blue) values, each normally ranging from 0–255, with (0, 0, 0) ideally corresponding to black and (255, 255, 255) to white (no colorant). Typically, a scanner must be calibrated in order to provide accurate mapping from the scanner's color representations to corresponding device-independent color representations, over the range of colors that can be produced by an associated printer. Accurate device-independent representations can then be shared with other devices (such as a monitor), enabling them to accurately reproduce colors that look like the colors in the scanned printed image. The use of the term "color printed image" is intended to include not only images printed on paper but also other types of scanner inputs, such as films, transparencies, and slides. The term "printer" is intended to include the devices producing such scanner inputs and against whose output the scanner is to be calibrated.

One approach to scanner calibration involves building a look-up table, whose entries are indexed by scanner color representation, with each entry containing a respective corresponding device-independent color representation. The scanner color representation associated with each table entry is obtained by scanning a printed sample of a respective color from the printer's color space. The corresponding device-independent color representation is obtained by examining the printed color sample with a device that can provide device-independent color representations, such as a spectrophotometer. An interpolation technique is used to calculate a device-independent color representation corresponding to an arbitrary scanner color representation, using the values stored in two or more of the look-up table entries. This approach suffers from several drawbacks:

1) This typically requires a large number (typically hundreds) of table entries in order to obtain reasonably accurate device-independent color representations. In other words, a large number of color samples from the printer's color space must be printed, scanned by the scanner, and examined by the spectrophotometer. If the spectrophotometric measurement of the samples are done manually, this results in a painfully slow calibration process. This is particularly problematic given that the calibration process may have to be frequently performed, on account of changing conditions. For example, printer colorants change from batch to batch as well as over time, and the scanner's spectral response varies depending on environmental conditions and over time. While it is possible to reduce the amount of manual effort by providing an automated stage mechanism for moving the color samples relative to the spectrophotometer device, this is expensive and bulky.

2) The required interpolation technique is typically three-dimensional, and thus computationally expensive. Given that a scanned image may have millions of pixels, the interpolation technique may result in an unacceptably slow mapping from a scanner representation to a device-independent representation of the colors in the image.

In view of these difficulties, attempts have been made to find a linear mapping between the scanner's device-dependent color representations (e.g., scanner RGB values) and the desired device-independent color representations (e.g., XYZ values). Put another way, attempts have been made to determine a 3×3 transformation matrix, M, such that the XYZ values, denoted $X_a$, $Y_a$, and $Z_a$, for an arbitrary set of scanner RGB values denoted $R_a$, $G_a$, and $B_a$, are determined as follows:

$$(X_a, Y_a, Z_a) = (R_a, G_a, B_a) * M.$$

This has typically been done by measuring a number of color samples distributed over the printer's color space, and doing a least squares fit (or other type of fit) to determine the matrix parameters. Since the mapping is, in general, not linear over the entire color space, such efforts have not led to acceptable results.

Thus, the problem of adequately calibrating a scanner to provide device-independent values continues to require expensive or time-consuming solutions.

SUMMARY OF THE INVENTION

The present invention provides an efficient technique for calibrating a scanner relative to a particular colorant set having N primary colorants. Once the scanner is calibrated, the scanner's device-dependent tristimulus values for an arbitrary color are transformed to a device-independent representation of the arbitrary color in a computationally efficient manner.

In short, the present invention recognizes, and exploits the fact that the color space defined by the primary colorants can be advantageously partitioned, with each partition being represented by a transform that accurately characterizes the transformation for that partition of the space. The partitioning is characterized by a set of M key colors (in a specific embodiment, M=2N), each of which defines a boundary between adjacent partitions. The key colors define a cyclical sequence according to their respective hues. The term hue represents the property of a pure color that distinguishes it from other pure colors, and thus the property that gives a color its principal name, such as "red", "yellow", or "blue-green". Thus, hue is that property associated with wavelength.

Briefly, a calibration technique according to the invention entails: measuring, both with the scanner and with a measurement device that provides device-independent color representations, color samples for the key colors and a region of bare substrate; and using the sets of measurements to generate a set of transformations, each associated with an adjacent pair of key colors.

More specifically, the calibration technique includes the following steps:

1) printing a set of color samples for a set of M key colors on a substrate (e.g. paper, film, transparency) with a device using the particular colorant set, each key color being either a primary colorant or a combination of an adjacent (in the sense of hue) pair of primary colorants, the key colors defining a cyclical sequence;

2) measuring each sample and a region of bare substrate with a device that provides a device-independent representation to obtain a set of M+1 device-independent representations of the M samples and the region of bare substrate;

3) measuring each sample and the region of bare substrate with the scanner to be calibrated to obtain a set of M+1 scanner representations of the M samples and the region of bare substrate; and 4) establishing a mapping from the scanner representations to the device-independent representations, the mapping is characterized by a set of M transforms, each given transform being associated with a different pair of key colors that are adjacent in the cyclical sequence.

In one embodiment, each of the transforms is characterized by a 3×3 transformation matrix. For each pair of adjacent key colors, a and b, the transformation matrix, $T_{ab}$, associated with a and b is determined by solving the 3×3 system of equations given by $S_{ab}*T_{ab}=I_{ab}$, where $S_{ab}$ is a 3×3 matrix whose respective rows contains the scanner representations for key colors a and b and bare substrate and $I_{ab}$ is a 3×3 matrix whose respective rows contains the device-independent representations for key colors a and b and bare substrate.

In a specific embodiment, the scanner representations are RGB tristimulus values and the device-independent representation of a color is the XYZ values for that color. Further, in a preferred embodiment, the key colors include the N primary colorants, printed at maximum chroma (dot coverage), and the N overprints of pairs of adjacent primary colorants at maximum chroma.

The calibration preferably further includes providing a mechanism for determining which of the M transformation matrices applies to a given arbitrary color, i.e., which partition of the printer's color space contains the arbitrary color. This mechanism entails determining a set of hue values that correspond to the key colors, and thus define the boundaries between adjacent partitions. This is preferably done by converting the scanner RGB values for the key colors to values in a chromaticity space that is spanned by a lightness value that correlates with luminance and a pair of chromaticity values in a two-dimensional space that spans hue and chroma, and then determining hue values for the key colors.

In a specific embodiment, the pair of chromaticity values, denoted t and d, are related to the RGB values according to the equations $$t=2(R-G)/(2R+3G+2B) \text{ and}$$

$$d=(R+G-2B)/(2R+3G+2B),$$

the lightness value, designated V, is given by the equation $$V=(2R+3G+2B)/2, \text{ and}$$

the hue angle, $\theta$, is determined from t and d by the equation $$\theta=\tan^{-1}(t/d).$$

In addition, the invention provides a technique for converting a scanner measurement for an arbitrary color into a corresponding device-independent measurement, given the above set of M transforms. The technique includes the following steps:

1) determining, on the basis of the scanner measurement of the arbitrary color, an applicable one of the M transforms; and 2) applying the applicable one of the M transforms, so determined, to the scanner measurement of the arbitrary color to obtain a device-independent measurement of the arbitrary color.

In a specific embodiment, the applicable transform for the arbitrary color is determined by:

transforming the scanner measurement for the arbitrary color into chromaticity values which include a hue value; and determining which pair of key color hue values minimally spans the arbitrary color's hue value. If, perchance, the arbitrary color's hue value is equal to the hue value of one of the key colors, either of the transforms for which that key color is one of the associated key colors may be used.

A further understanding of the nature and advantages of the present invention may be realized by reference to the remaining portions of the specification and the drawings.

DESCRIPTION OF SPECIFIC EMBODIMENTS

Hardware System Overview

Figure 1:
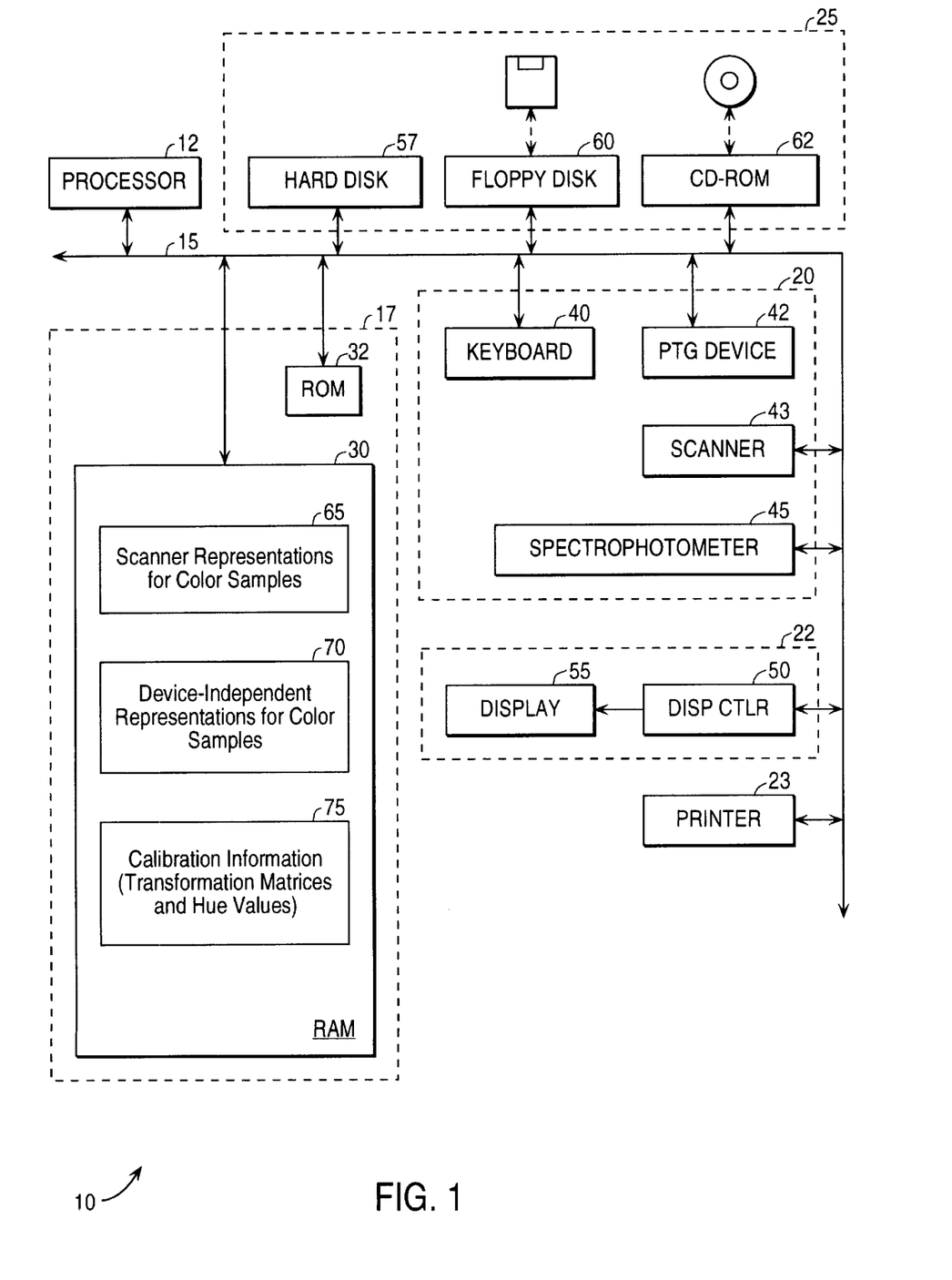
FIG. 1 is a block diagram of a computer system in which the present invention may be embodied.

FIG. 1 is a simplified block diagram of a computer system 10 in which the present invention may be embodied. In accordance with known practice, the computer system includes a processor 12 that communicates with a number of peripheral devices via a bus subsystem 15. These peripheral devices typically include a memory subsystem 17, a user input facility 20, a display subsystem 22, output devices such as a printer 23 (as broadly defined in the background section), and a file storage system 25.

In this context, the term "bus subsystem" is used generically so as to include any mechanism for letting the various components of the system communicate with each other as intended. With the exception of the input devices and the display, the other components need not be at the same physical location. Thus, for example, portions of the file storage system could be connected via various local-area or wide-area network media, including telephone lines. Similarly, the input devices and display need not be at the same location as the processor, although it is anticipated that the present invention will most often be implemented in the context of PCs and workstations.

Bus subsystem 15 is shown schematically as a single bus, but a typical system has a number of buses such as a local bus and one or more expansion buses (e.g., ADB, SCSI, ISA, EISA, MCA, NuBus, or PCI), as well as serial and parallel ports. Network connections are usually established through a device such as a network adapter on one of these expansion buses or a modem on a serial port. The computer system may be a desktop system or a portable system.

Memory subsystem 17 includes a number of memories including a random access memory (RAM) 30 (possibly including one or more caches) and a read only memory (ROM) 32 in which fixed instructions are stored. In the case of Macintosh-compatible personal computers this would include portions of the operating system; in the case of IBM-compatible personal computers, this would include the BIOS (basic input/output system).

User input facility 20 includes a keyboard 40, a pointing device 42, a scanner 43 (as broadly defined in the background section), and a spectrophotometer 45. In other embodiments the role of spectrophotometer 45 could be performed by a calorimeter. A densitometer may be a useful adjunct. The pointing device may be an indirect pointing device such as a mouse, trackball, touchpad, or graphics tablet, or a direct pointing device such as a touchscreen incorporated into the display. Scanner 43 produces a bitmap image corresponding to a photographic print or slide. Spectrophotometer 45 is a color measurement device that provides device-independent spectrometric information about a single color. In a specific embodiment, the spectrophotometer may be a Colortron™ 32-band digital color sensor device, available from Light Source Computer Images, Inc., located in San Rafael, Calif.

Display subsystem 22 typically includes a display controller 50 and a display device 55 coupled to the controller. The display device may be a cathode ray tube (CRT), a flat-panel device such as a liquid crystal display (LCD), or a projection device. Display controller provides control signals to the display device and normally includes a display memory (not shown in the figure) for storing the pixels that appear on the display device.

The file storage system provides persistent (non-volatile) storage for program and data files, and typically includes at least one hard disk drive 57 and at least one floppy disk drive 60. There may also be other devices such as a CD-ROM drive 62 and optical drives. Additionally, the system may include hard drives of the type with removable media cartridges. As noted above, one or more of the drives may be located at a remote location, such as in a server on a local area network or at a site on the Internet's World Wide Web.

In accordance with the present invention, a set of color samples produced by printer 23 are scanned by scanner 43 to produce a corresponding set of scanner color representations which are stored in a table 65. In the specific embodiment discussed below, the color representations produced by scanner 43 consist of RGB values. However, the present invention is equally applicable to embodiments in which scanner 43 produces color representations other than RGB representations. The invention is equally applicable to calibrating a scanner whose input is other than paper (e.g. slides, film) against a particular device producing that type of scanner input. In this situation, the particular device is used to produce the set of color samples to be scanned by the scanner.

Spectrophotometer 45 individually examines each of the color samples and produces corresponding device-independent color representations which are stored in a table 70. In the specific embodiment discussed below, spectrophotometer 45 produces XYZ color representations, as defined by the CIE (Commission Internationale de l' Éclarage in French). However, the present invention is equally applicable to embodiments in which spectrophotometer 45 produces device-independent tristimulus color representations other than XYZ representations (such as the CIE-defined xyY, Lab, or Luv color spaces).

A program executing on processor 12 uses the values stored in tables 65 and 70 to generate calibration information 75, that includes a set of transformation matrices and hue values which information is used to transform a representation produced by scanner 43 for an arbitrary color produced by printer 23 into an equivalent device-independent color representation for the arbitrary color. Calibration information 75, once constructed, is typically stored on one of the devices in file storage subsystem 22. The calibration information, when it is to be used to transform scanner representations of arbitrary colors to corresponding device-independent representations, is read into RAM 30. Tables 65 and 70 and calibration information 75 and their methods of construction and use will be described in detail in later sections.

Scanner Calibration

Figure 2A:
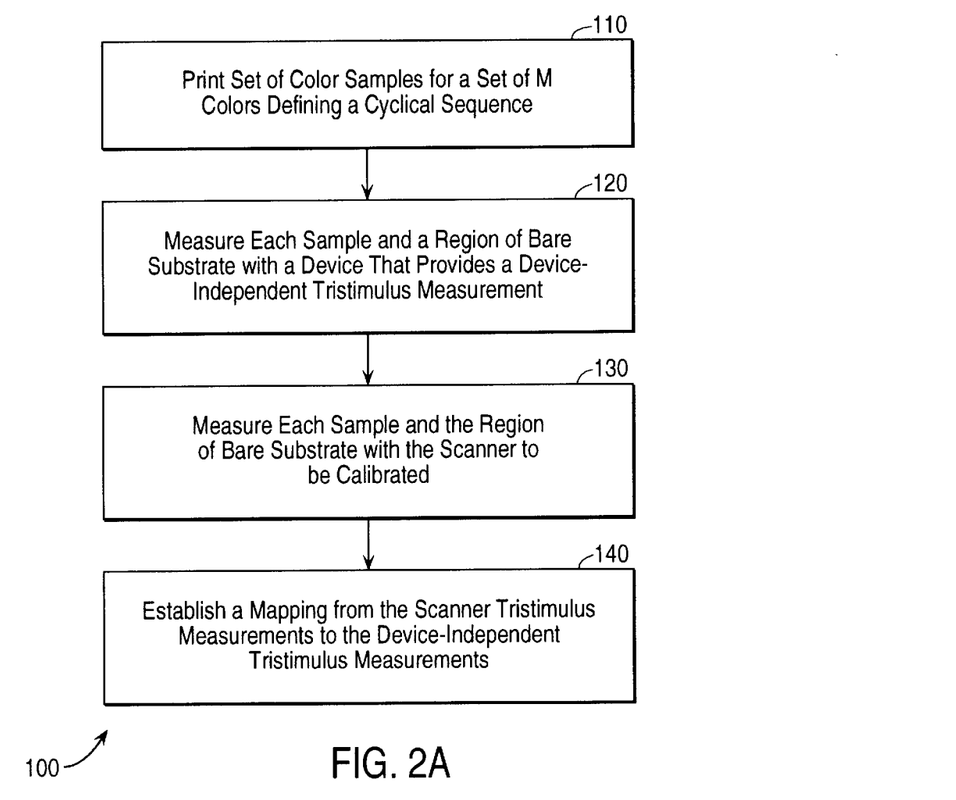
FIG. 2A is a flowchart for calibrating a scanner relative to a particular printer's colorant set.

FIG. 2 is a flowchart 100 for a method of calibrating a scanner relative to a particular colorant set of printer 23, in accordance with the present invention. In a step 110, printer 23 is used to print a set of color samples for 6 colors (referred to hereinafter as "key" colors) defining a cyclical sequence, where each of the key colors is either one of primary colorants of printer 23 or a combination of an adjacent pair of primary colorants. For a particular four-color printer, there are three primary colorants, namely cyan, yellow, and magenta, plus a neutral colorant (black). The cyclical sequence of six key colors is <u>cyan</u>, <u>green</u> (overprint of cyan and yellow), <u>yellow</u>, red (overprint of yellow and magenta), <u>magenta</u>, and <u>blue</u> (overprint of magenta and cyan), where each of the key colors has the maximum chroma (i.e., maximum dot coverage) that printer 23 can produce for the hue of that key color.

Figure 2B:
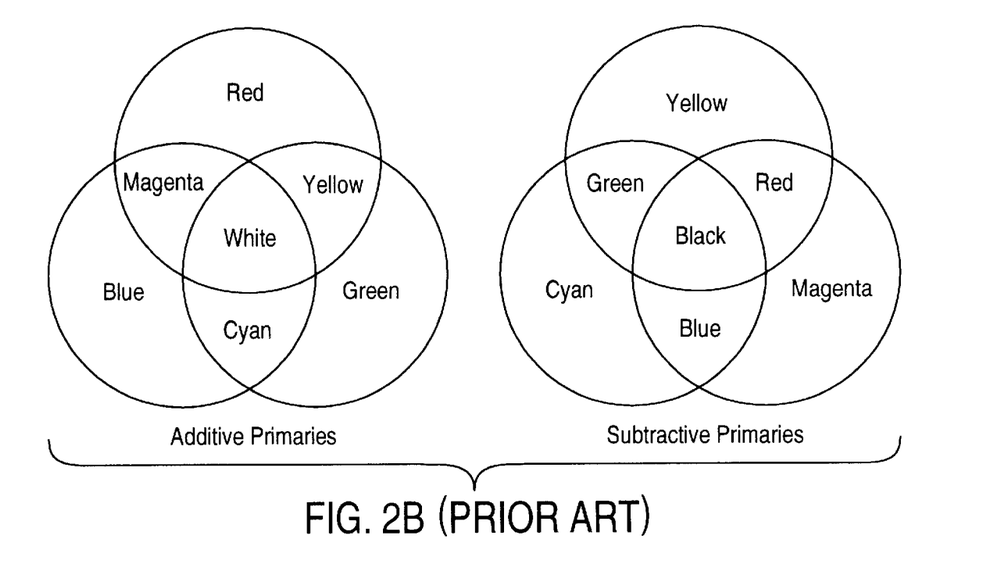
FIG. 2B is a simplified view showing how different colors can be obtained by combinations of three additive primaries (left-hand portion) and three subtractive primaries (right-hand portion)

FIG. 2B (right-hand portion) shows how the three subtractive primaries, namely cyan, yellow, and magenta, interspersed by their pairwise overprints, namely green, red, and blue, define this cyclical sequence in hue.

In other embodiments, different printer primary colorant sets, and different key color sets may be used. For example, in six-color printing, there are five primary colorants, namely cyan, green, yellow, orange, and magenta, plus black. In such a case, the key colors include the five primary colorants, and the five combinations of adjacent primary colorants. Note that in the case of three primary colorants, all pairs of primary colorants are adjacent pairs. Where there are five primary colorants, there are only five adjacent pairs of the ten possible pairwise combinations.

In a step 120, each sample and a region of bare substrate (i.e., white) is measured with spectrophotometer 45 to obtain a set of seven device-independent tristimulus (in particular, XYZ) measurements of the six samples and the region of bare substrate. In other embodiments, device-independent tristimulus color representations other than XYZ representations (such as the CIE-defined xyY, Lab, or Luv color spaces) may be produced by spectrophotometer 45. The XYZ measurements for the key colors cyan, green, yellow, red, magenta, and blue, and the white region of bare substrate are denoted herein by $X_c Y_c Z_c$, $X_g Y_g Z_g$, $X_y Y_y Z_y$, $X_r Y_r Z_r$, $X_m Y_m Z_m$, $X_b Y_b Z_b$, and $X_w Y_w Z_w$, respectively.

In a step 130, each sample and a region of bare substrate is measured with scanner 43 to obtain a set of seven scanner tristimulus (in particular, RGB) measurements of the six samples and the region of bare substrate. In other embodiments, scanner representations other than RGB representations may be produced by scanner 43. The RGB measurements for the key colors cyan, green, yellow, red, magenta, and blue, and the white region of bare substrate are denoted herein by $R_cG_cB_c$, $R_gG_gB_g$, $R_yG_yB_y$, $R_rG_rB_r$, $R_mG_mB_m$, $R_bG_bB_b$, and $R_wG_wB_w$, respectively.

In a step 140, a program executing on processor 12 computes a mapping from the scanner tristimulus measurements obtained in step 23 to the device-independent tristimulus measurements obtained in step 22. The computed mapping consists of a set of six 3×3 transformation matrices, each given matrix being associated with a different pair of adjacent key colors. The transformation matrix, Mcg, associated with cyan and green, is computed by solving the following 3×3 linear system of equations:

$$\begin{bmatrix} R_c & G_c & B_c \\ R_g & G_g & B_g \\ R_w & G_w & B_w \end{bmatrix} \begin{bmatrix} Mcg_{11} & Mcg_{12} & Mcg_{13} \\ Mcg_{21} & Mcg_{22} & Mcg_{23} \\ Mcg_{31} & Mcg_{32} & Mcg_{33} \end{bmatrix} = \begin{bmatrix} X_c & Y_c & Z_c \\ X_g & Y_g & Z_g \\ X_w & Y_w & Z_w \end{bmatrix}$$

The five other transformation matrices are similarly computed.

In other embodiments, transforms other than linear transformation (i.e. non-linear transformations) may be determined for each pair of adjacent key colors.

Transforming Arbitrary Colors

Figure 3:
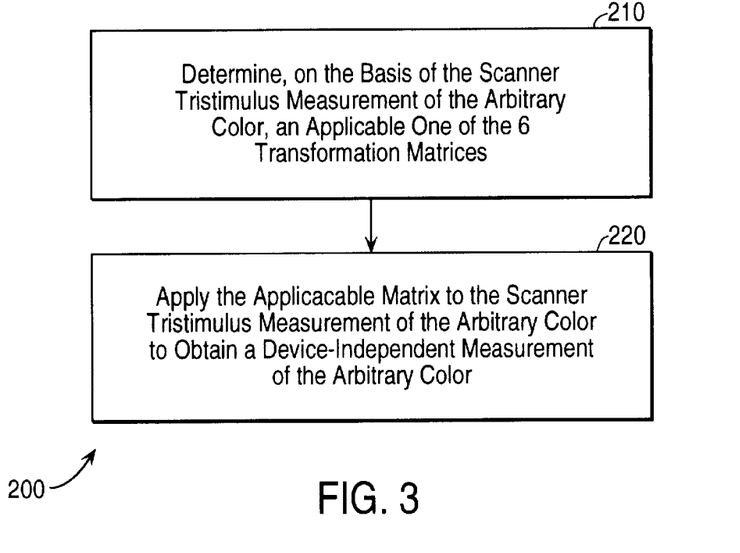
FIG. 3 is a flowchart for transforming an RGB measurement of an arbitrary color into a corresponding XYZ measurement.

FIG. 3 is a flowchart 200 for a method of transforming an RGB measurement of an arbitrary color into a corresponding XYZ measurement. In a step 210, a program running on processor 12 determines, on the basis of the RGB measurement of the arbitrary color, an applicable one of the six transformation matrices computed during the calibration process (i.e., step 140 of FIG. 2). In step 220, the applicable matrix is applied to the scanner RGB measurement of the arbitrary color to obtain an XYZ measurement for the arbitrary color. For example, if the RGB measurement of the arbitrary color is given by $R_a, G_a, B_a$ and the applicable transformation matrix is determined in step 210 to be Mcg, then in step 220 the XYZ measurement for the arbitrary color, $X_aY_aZ_a$, is determined as follows:

$$(X_a, Y_a, Z_a) = (R_a, G_a, B_a) * Mcg$$

Figure 4:
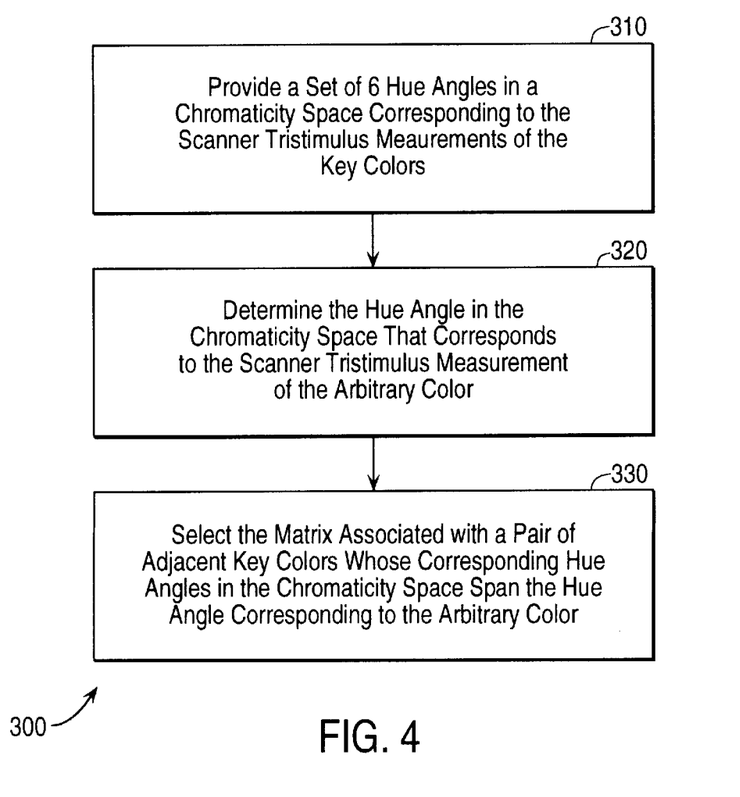
FIG. 4 is a flowchart for determining the applicable transformation matrix for transforming a scanner measurement of an arbitrary color into a corresponding device-independent measurement.

FIG. 4 depicts, for one embodiment, a flowchart 300 for step 210 of FIG. 3. In a step 310, a set of six hue angles in a chromaticity space corresponding, respectively, to the six scanner RGB measurements for the six key colors obtained during the calibration process (i.e., step 130 of FIG. 2) is provided. A chromaticity space is spanned by a lightness value that correlates with luminance and a pair of chromaticity values in a two-dimensional space that spans hue and chroma. In some embodiments, the set of six hue angles are determined during the calibration process, and stored as part of the calibration information. In other embodiments, the scanner representations of the key colors are stored, and hue angles corresponding to the key colors are determined each time an image is scanned.

In a step 320, the hue angle in the chromaticity space corresponding to the scanner's RGB measurement for the arbitrary color is determined. In a step 330, the applicable transformation matrix is determined as that associated with two adjacent key colors, whose corresponding hue angles (determined in step 310) span the hue angle corresponding to the arbitrary color (determined in step 320).

In one embodiment, the pair of chromaticity values, denoted t and d, corresponding to an RGB value, (R,G,B), are computed according to the equations $$t = 2(R-G)/(2R+3G+2B) \text{ and}$$

$$d = (R+G-2B)/(2R+3G+2B);$$

the lightness value, designated V, is given by the equation $$V = (2R+3G+2B)/2; \text{ and}$$

the hue angle, θ, is determined from t and d by the equation $$\theta = \tan^{-1}(t/d).$$

Other chromaticity spaces, such as xyY, could be used to determine the hue angles for the key colors and the arbitrary colors. However, the chromaticity space should have the property that the two chromaticity values, while spanning hue and chroma, have little or no correlation with luminance. The particular chromaticity space defined above is highly suitable in this regard.

Linearizing and Balancing the Scanner

In one embodiment, the transformation matrices described above transform <u>linearized and balanced</u> scanner measurements into corresponding device-independent measurements. Scanner 43 is used to produce "raw" scanner measurements for each of the key colors and bare substrate. The raw scanner measurements are linearized and balanced to produce linearized and balanced scanner measurements. Each of M 3×3 matrices for transforming linearized and balanced scanner measurements into corresponding device-independent measurements are obtained by solving equations, as described above, relating the linearized and balanced scanner measurements and the corresponding device-independent measurements obtained for a respective pair of adjacent key colors and for the bare substrate.

To correct a raw scanner measurement for an arbitrary color, the raw measurement is first converted into a linearized and balanced scanner measurement. A hue angle corresponding to the linearized and balanced scanner measurement is determined. A respective hue angle corresponding to the linearized and balanced measurement for each key color is determined either at the time of calibration or correction, as described above. The pair of adjacent key colors whose respective hue angles span the hue angle corresponding to the linearized and balanced scanner measurement for the arbitrary color are determined. Finally, the matrix corresponding to the determined pair of adjacent key colors is applied to the linearized and balanced scanner measurement for the arbitrary color to obtain a corresponding device-independent measurement.

In one embodiment, linearizing and balancing a scanner producing RGB measurements involves the following steps:

1) Assembling a set of calibration patches $N_0, N_1, \ldots N_n$ that are chromatically neutral and are evenly spaced in reflectance. $N_0$ represents absolute darkness as closely as possible and $N_n$ represents the brightest possible white paper (or bare substrate).

2) Devising a mapping LS from raw scanner RGB values to linearized and balanced scanner RGB values. LS must cause each of the raw scanner RGB values for the calibration patches to have equal linearized and balanced scanner R, G, and B values. Let $K_i$ be that value for $N_i$, i=1, ..., n. That is, the linearized and balanced scanner RGB values for $N_i$ are $(K_i, K_i, K_i)$, i=1, ..., n. $K_0=0$. $K_n$=the maximum RGB coordinate value. $K_0, K_i$, ... $K_n$ are evenly spaced in the range of RGB coordinate values.

In one embodiment linearized and balanced scanner values lie in the interval [0,255]. The function LS is implemented as a set of three look-up tables, one each for the R, G, and B coordinates. Each table is indexed by raw scanner values and contains linearized and balanced scanner values.

Non-tristimulus Scanner Measurements

The invention is equally applicable to embodiments where scanner 43 produces a measurement other than a tristimulus measurement. For example, in one such embodiment scanner 43 might output quadstimulus (i.e. four-valued) measurements. In this embodiment, six 4×3 transformation matrices could be determined in a manner analogous to that described above for determining six 3×3 transformations in an embodiment where scanner 43 produces tristimulus measurements. The 4×3 matrix corresponding to a particular pair of adjacent key colors could be determined by solving a set of equations relating the linearized and balanced scanner measurements and the corresponding device-independent measurements obtained for the pair of adjacent key colors, for an additional color of hue intermediate between the respective hues of the adjacent key colors and bare substrate, and for bare substrate. The process of correcting a scanner quadstimulus measurement to obtain a corresponding device-independent XYZ measurement would involve multiplying the scanner measurement by one of the 4×3 transformation matrices, selected as described above.

Conclusion

In conclusion, it can be seen that the present invention provides extremely effective and efficient techniques for calibrating scanners and thereby allowing the conversion of a scanner measurement to a device-independent representation. The invention obviates the need to measure a large number of samples, and therefore further obviates the need for an automated stage mechanism.

In a particular experiment, using an ink-jet color printer, a target was prepared having 270 color patches, including patches for the six key colors. The target included colors that were pairwise and three-way combinations of the primary colorants. The key colors were measured and the scanner calibrated as described above. All the color patches were scanned and measured photometrically.

XYZ values were computed for each patch, based on the invention and on a least squares analysis, and the computed XYZ values compared to the measured ("correct") XYZ values. The differences were expressed in Lab space, as known in the art. Using the techniques of the present invention on the data led to an average $\Delta E$ Lab of 2.33 and a maximum $\Delta E$ Lab of 6.11. On the other hand, performing a least squares analysis and applying a correction matrix based on the least squares analysis led to an average $\Delta E$ Lab of 4.84 and a maximum $\Delta E$ Lab of 14.1.

While the above is a complete description of specific embodiments of the invention, various modifications, alternative constructions, and equivalents may be used. Therefore, the above description should not be taken as limiting the scope of the invention as defined by the claims.

References

The following publications provide additional background and are incorporated by reference: E. M. Granger, "Is CIE L*a*b Good Enough for Desktop Publishing?", Device-Independent Color Imaging, SPIE, Vol. 2170, pp. 144–148 (Feb. 7–8, 1994, San Jose, Calif.); E. M. Granger, "ATD, Appearance Equivalence, and Desktop Publishing," Device-Independent Color Imaging, SPIE, Vol. 2170, pp. 163–168 (Feb. 7–8, 1994, San Jose, Calif.); and E. M. Granger, "Gamut Mapping for Hard Copy Using the ATD Color Space," Device-Independent Color Imaging II, SPIE, Vol. 2414, pp. 27–35 (Feb. 7–8, 1995, San Jose, Calif.).

Also incorporated by reference is Edward M. Granger's U.S. application Ser. No. 08/595,404, filed Feb. 5, 1996, for "APPEARANCE-BASED TECHNIQUE FOR RENDERING COLORS ON AN OUTPUT DEVICE."

What is claimed:

1. A computer-implemented method of calibrating a scanner relative to a particular colorant set having N primary colorants, the method comprising the steps of:

printing a set of color samples for a set of M key colors on a substrate with a device using the particular colorant set, each key color being either a primary colorant or a combination of an adjacent pair of primary colorants, the key colors defining a cyclical sequence;

measuring each sample and a region of bare substrate with a device that provides a device-independent tristimulus measurement to obtain a set of M+1 device-independent tristimulus measurements of the M samples and the region of bare substrate;

measuring each sample and the region of bare substrate with the scanner to be calibrated to obtain a set of M+1 scanner measurements of the M samples and the region of bare substrate; and establishing a mapping from the scanner measurements to the device-independent tristimulus measurements, the mapping being characterized by a set of M transforms, each transform being associated with a different pair of key colors that are adjacent in the cyclical sequence, the transforms being such that when a given transform is applied to the scanner measurement of any given one of the pair of key colors associated with the given transform or the region of bare substrate, the result is the device-independent measurement of the given one of the pair of key colors associated with the given transform or the region of bare substrate.

2. The method of claim 1 wherein:

the device-independent tristimulus measurements are XYZ values; and the scanner measurements are RGB values.

3. The method of claim 2, wherein the scanner measurements are linearized and balanced RGB values.

4. The method of claim 1 wherein the set of key colors includes at least one primary colorant.

5. The method of claim 1 wherein the set of key colors includes at least one primary colorant at maximum dot coverage.

6. The method of claim 1 wherein the set of key colors includes at least one overprint of an adjacent pair of primary colorants.

7. The method of claim 1 wherein the set of key colors includes at least one overprint of an adjacent pair of primary colorants at maximum dot coverage for both primary colorants in the adjacent pair.

8. The method of claim 1 wherein the set of key colors includes:

the set of N primary colorants at maximum dot coverage; and overprints of N adjacent pairs of primary colorants at maximum dot coverage for both primary colorants in each of the adjacent pairs.

9. The method of claim 1, further including the step of determining, for each of the scanner measurements for the M samples, a corresponding hue value.

10. The method of claim 1 wherein:

each of the scanner measurements is a tristimulus measurement; and each of the M transforms is a 3×3 matrix.

11. The method of claim 1 wherein the set of key colors includes at least one primary colorant at maximum dot coverage and at least one overprint of an adjacent pair of primary colorants at maximum dot coverage for both primary colorants in the adjacent pair.

12. A computer-implemented method of correcting a scanner measurement of an arbitrary color, the arbitrary color being rendered with a particular colorant set having N primary colorants, the method comprising the steps of:

defining a set of M key colors in a cyclical sequence, each key color being either a primary colorant or a combination of an adjacent pair of primary colorants, the key colors defining a cyclical sequence;

providing a set of M transforms, each given transform being associated with a different pair of key colors that are adjacent in the cyclical sequence;

determining, on the basis of the scanner measurement of the arbitrary color, an applicable one of the M transforms; and applying the applicable one of the M transforms, so determined, to the scanner measurement of the arbitrary color to obtain a device-independent measurement of the arbitrary color.

13. The method of claim 12 wherein:
the device-independent measurement of the arbitrary color is a set of XYZ values; and
the scanner measurement of the arbitrary color is a set of RGB values.

14. The method of claim 12 wherein the set of key colors includes at least one primary colorant.

15. The method of claim 12 wherein the set of key colors includes at least one primary colorant at maximum dot coverage.

16. The method of claim 12 wherein the set of key colors includes at least one overprint of an adjacent pair of primary colorants.

17. The method of claim 12 wherein the set of key colors includes at least one overprint of an adjacent pair of primary colorants at maximum dot coverage for both primary colorants in the adjacent pair.

18. The method of claim 12 wherein the set of key colors includes:
the set of N primary colorants at maximum dot coverage; and
overprints of N adjacent pairs of primary colorants at maximum dot coverage for both primary colorants in each of the adjacent pairs.

19. The method of claim 12 wherein:
the scanner measurement of the arbitrary color is a tristimulus measurement; and
each of the M transforms is a 3×3 matrix.

20. The method of claim 12 wherein the step of determining an applicable one of the M transforms comprises:
providing a set of M hue values in a chromaticity space, each hue value being associated with a respective point in the chromaticity space, the respective point corresponding to a scanner measurement of a respective key color;
converting the scanner measurement of the arbitrary color to values in the chromaticity space, the values including a hue value for the arbitrary color;
determining a pair of key colors that are adjacent in the cyclical sequence, the hue values for which span the hue value for the arbitrary color; and
selecting the transform that is associated the pair of key colors, so determined.

21. The method of claim 20 wherein:
the scanner measurements for the key colors and arbitrary color are RGB values;
the hue values are hue angles;
the chromaticity space is spanned by a lightness value that correlates with luminance and a pair of chromaticity values in a two-dimensional space that spans hue and chroma;
the pair of chromaticity values, denoted t and d, which are related to the RGB values according to the equations $t=2(R-G)/(2R+3G+2B)$ and $d=(R+G-2B)/(2R+3G+2B);$ the lightness value, designated V, is given by the equation $V=(2R+3G+2B)/2;$ and the hue angle, θ, is determined from t and d by the equation $\theta=\tan^{-1}(t/d)$.

22. The method of claim 20 wherein:
the scanner measurements for the key colors and arbitrary color are linearized and balanced RGB values.

23. A computer-implemented method of calibrating a scanner relative to a particular colorant set having N primary colorants, the method comprising the steps of:

measuring each one of a set of color samples for a set of M key colors printed on a substrate with a device using the particular colorant set and a region of bare substrate with a device that provides a device-independent tristimulus measurement to obtain a set of M+1 device-independent tristimulus measurements of the M samples and the region of bare substrate, each key color being either a primary colorant or a combination of an adjacent pair of primary colorants, the key colors defining a cyclical sequence;

measuring each sample and the region of bare substrate with the scanner to be calibrated to obtain a set of M+1 scanner measurements of the M samples and the region of bare substrate; and establishing a mapping from the scanner measurements to the device-independent tristimulus measurements, the mapping being characterized by a set of M transforms, each transform being associated with a different pair of key colors that are adjacent in the cyclical sequence, the transforms being such that when a given transform is applied to the scanner measurement of any given one of the pair of key colors associated with the given transform or the region of bare substrate, the result is the device-independent measurement of the given one of the pair of key colors associated with the given transform or the region of bare substrate.

24. A memory for storing data for access by an application program being executed on a data processing system, the program operating to correct a scanner measurement of an arbitrary color, the arbitrary color being rendered with a particular colorant set having N primary colorants, the memory comprising:

a set of M transforms stored in the memory, each of the transforms being associated with a different pair of key colors chosen from a set of M key colors defining a cyclical sequence, each key color being either a primary colorant or a combination of an adjacent pair of primary colorants, the key colors in each pair being adjacent in the cyclical sequence.

25. The memory of claim 24, further comprising:
a set of M hue values stored in the memory, each of the hue values corresponding to a respective one of the key colors.

26. A computer-implemented method of calibrating a scanner relative to a particular colorant set having N primary colorants, the method comprising the steps of:
printing a set of color samples for a set of M key colors on a substrate with a device using the particular colorant set, each key color being either a primary colorant or a combination of an adjacent pair of primary colorants, the key colors defining a cyclical sequence;
measuring each sample and a region of bare substrate with a device that provides a device-independent tristimulus measurement to obtain a set of M+1 device-independent tristimulus measurements of the M samples and the region of bare substrate;
measuring each sample and the region of bare substrate with the scanner to be calibrated to obtain a set of M+1 scanner measurements of the M samples and the region of bare substrate;
establishing a mapping from the scanner measurements to the device-independent tristimulus measurements, the mapping being characterized by a set of M transformation matrices, each transformation matrix being associated with a different pair of key colors that are adjacent in the cyclical sequence, each given transformation matrix being derived from (a) the scanner measurements of the pair of key colors associated with the given transform and the region of bare substrate, and (b) the device-independent measurements of the key colors associated with the given transform or the region of bare substrate; and
determining, for each of the scanner measurements for the M samples, a corresponding hue value.

27. The method of claim 26 wherein:
the device-independent tristimulus measurements are XYZ values;
the scanner measurements are RGB values; and
the transformation matrices are 3×3 matrices.

28. The method of claim 26, wherein the scanner measurements are linearized and balanced RGB values.

29. A computer-implemented method of correcting a scanner measurement of an arbitrary color, the arbitrary color being rendered with a particular colorant set having N primary colorants, the method comprising the steps of:
defining a set of M key colors in a cyclical sequence, each key color being either a primary colorant or a combination of an adjacent pair of primary colorants, the key colors defining a cyclical sequence;
providing a set of M transformation matrices, each transformation matrix being associated with a different pair of key colors that are adjacent in the cyclical sequence;
providing a set of M hue values in a chromaticity space, each hue value corresponding to a respective one of the key colors;
converting the scanner measurement of the arbitrary color to values in the chromaticity space, the values including a hue value for the arbitrary color;
determining a pair of key colors that are adjacent in the cyclical sequence, the hue values for which span the hue value for the arbitrary color;
selecting the transformation matrix that is associated with the pair of key colors, so determined; and
applying the transformation matrix, so determined, to the scanner measurement of the arbitrary color to obtain a device-independent measurement of the arbitrary color.

30. The method of claim 29 wherein:
the device-independent measurement of the arbitrary color is a set of XYZ values;
the scanner measurement of the arbitrary color is a set of RGB values; and
the transformation matrices are 3×3 matrices.

31. The method of claim 29 wherein the set of key colors includes at least one primary colorant at maximum dot coverage and at least one overprint of an adjacent pair of primary colorants at maximum dot coverage for both primary colorants in the adjacent pair.

32. The method of claim 29 wherein:
the scanner measurements for the key colors and arbitrary color are RGB values;
the hue values are hue angles;
the chromaticity space is spanned by a lightness value that correlates with luminance and a pair of chromaticity values in a two-dimensional space that spans hue and chroma;
the pair of chromaticity values, denoted t and d, which are related to the RGB values according to the equations $$t = 2(R-G)/(2R+3G+2B) \text{ and}$$
$$d = (R+G-2B)/(2R+3G+2B);$$

the lightness value, designated V, is given by the equation $$V = (2R+3G+2B)/2; \text{ and}$$

the hue angle, $\theta$, is determined from t and d by the equation $$\theta = \tan^{-1}(t/d).$$

* * * * *